May 19, 1964            P. BORN            3,133,372

ARTIFICIAL FISHING LURES

Filed Dec. 15, 1961

INVENTOR.
PETER BORN
BY David K. Kilgore
ATTORNEY

United States Patent Office 3,133,372
Patented May 19, 1964

3,133,372
ARTIFICIAL FISHING LURES
Peter Born, 3112 30th Ave. S., Minneapolis, Minn.
Filed Dec. 15, 1961, Ser. No. 159,545
3 Claims. (Cl. 43—42.34)

This invention relates broadly to artificial fishing lures, more particularly to an artificial lure that is especially intended for use in ice fishing and still fishing, and specifically to an artificial lure wherein underwater movement is imparted thereto by manipulation of the fishing line attached to the said artificial lure.

The principal object of this invention is to provide an artificial fishing lure that is especially well adapted for use in ice fishing and still fishing wherein common procedures limit the underwater area that can be covered by the fisherman from a given spot.

A further object of this invention is to provide an artificial fishing lure that is constructed and arranged in connection with terminal tackle to move in a forwardly direction underwater in response to vertical up and down impulses imparted to the fishing line by the fisherman.

A further object of this invention is to provide an artificial fishing lure which when motivated by the action of the fishing line thereon simulates the underwater swimming movements of an actual fish or minnow.

A further object of this invention is to provide an artificial fishing lure wherein the actual appearance of an actual fish or minnow is simulated.

A still further object of this invention is to provide an artificial fishing lure which, when motivated underwater, by action imparted thereto by the up and down movement of the fishing line, will travel generally forward but at the same time pursue a spiral circular route thereby covering a larged underwater area from a given spot.

These and other objects of the invention will become apparent from the following specifications and claims when taken in conjunction with the accompanying drawing which forms a part of this application and in which drawing, like characters indicate like parts throughout the several views.

To the above end, generally stated, the invention consists of the following devices and combination of devices hereinafter described and defined in the claims.

Referring to the drawing.

Figure 1:
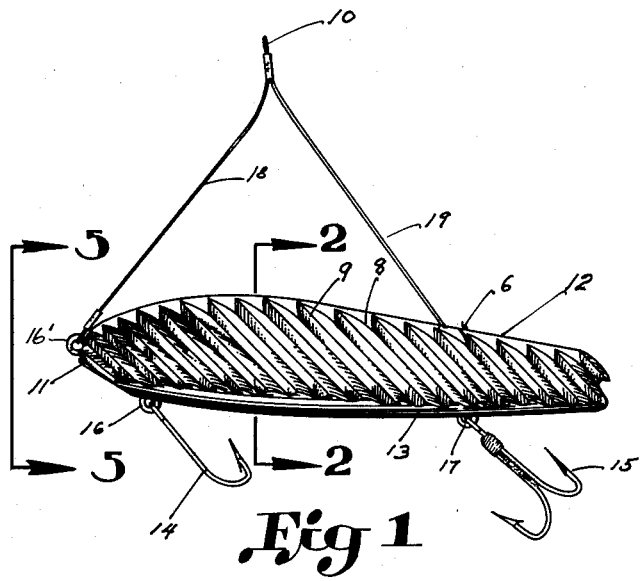
FIG. 1 is a side elevational view of the invention in its entirety.
Figure 2:
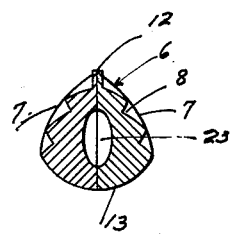
FIG. 2 is a transverse sectional view thereof taken on the line 2—2 of FIG. 1.
Figure 3:
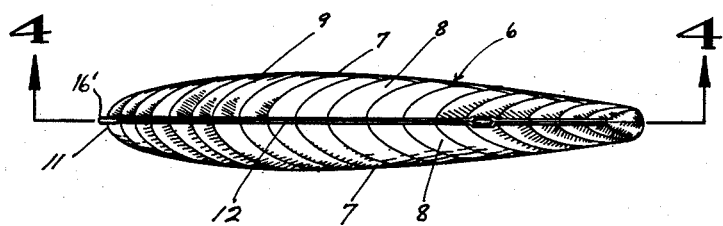
FIG. 3 is a top plan view.
Figure 4:
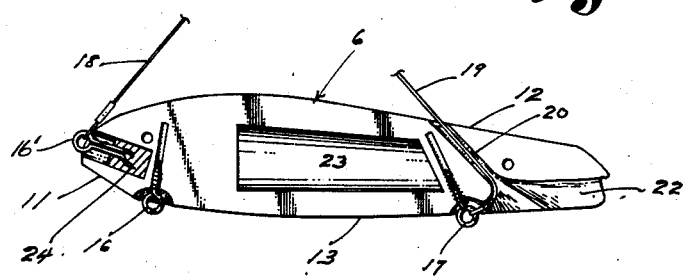
FIG. 4 is a longitudinal sectional view taken on the line 4—4 of FIG. 3.

The numeral 6 is directed to the body portion of the artificial lure and generally, the said body portion 6 is constructed to simulate the body of an actual fish or minnow wherein the contours thereof taper forwardly and rearwardly from substantially the longitudinal center. This taper of the body portion 6 is evident when the lure is viewed from the side and the top, and in cross-section, the said body member is substantially triangular with the sides and corners of said triangle being slightly bowed outwardly and rounded.

The side portions 7 of the body portion 6 are corrugated and consist of a plurality of parallel alternate elongate grooves 8 and ridges being inclined generally forwardly at an angle off-set from both the vertical and horizontal, preferably at an angle approximately 45°. These ridges 9 serve as vanes to propel the lure generally forwardly and somewhat downwardly as the lure is raised and lowered in the water as the result of manipulation of the fishing line 10 by the fisherman and the contact of the water with the said vanes. The ridges 9 or vanes extend from the top to the bottom of the body portion 6 and are preferably of tapered or triangular cross-section, being widest at the point where they join the body portion 6 and tapering outwardly to a peak or crest. This arrangement streamlines the artificial lure and permits for a smooth fluid flow about said artificial lure.

Figure 5:
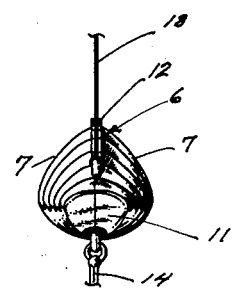
FIG. 5 is a front elevational view taken on the line 5—5 of FIG. 1.

The leading forward end portion of the bottom of the body portion 6 is terminated in a forwardly and upwardly inclined plane to afford a relatively flat planing surface 11 that greatly enhances the gliding action and movements of the artificial lure when the same is in contact with the water, see FIG. 5.

The extreme top or crest 12 of the body portion 6 is provided with a smooth curvilinear edge which eliminates the saw tooth edges or serrated effect which would otherwise result from the intersection of the grooves and ridges 8 and 9 respectively on the adjacent sides 7 of the artificial lure. The curvilinear surface prevents the ridges 9 at the top 12 of the artificial lure from engaging and snagging on weeds and vegetation as the artificial lure passes therethrough. It will be further understood that the underside or bottom of the body portion 6 is also smooth surfaced.

A forward fish hook 14 and a rear fish hook 15 are suspended from the body portion 6 of the lure by means of small screw eyes 16 and 17 that are securely anchored in said body portion 6. The rear screw eyes 17 serve also as a means whereby the rear guy line 19 is attached to the said body portion 6 of the lure. The forward guy line 18 is attached to a second forwardly positioned screw eye 16' in the nose portion of the body 6 of the lure and thence runs to a junction with the rear guy line 19 to a postion above the body portion 6. From its connection with the screw eye 17 the rear guy line 19 passes through a narrow passageway 20 in the main body portion 6 of the lure to the said junction with the guy line 18 to thus afford two point suspension which is necessary and critical to achieve proper action of the lure in water. The outer end portion of the guy lines 18 and 19 are joined together as shown in FIG. 1 above the main body portion 6 and are thence attached to the main fishing line 10. A longitudinally disposed recess 22 is formed in the lower rear end portion of the main body portion 6 of the artificial lure and is provided to maintain the rear fish hook 15 in a trailing position when the artificial lure is moving in the water.

A watertight floatation chamber 23 is formed in the main body portion 6 of the artificial lure substantially at the longitudinal and transverse center thereof. This floatation chamber 23 in combination with the general design and suspension of the lure, and a lead weight 24 in the forward end portion of the lure unbalances the lure so that the center of gravity thereof in normal operation, is forward of its geometrical center. The size, and position of the floatation chamber 23 and the lead weight are critical in order to impart forward motion of the lure when the same is bobbed or jigged by virtue of water action on the grooves and ridges 8 and 9 respectively of the main body portion 6.

In actual use, the lure is attached as terminal tackle to a main fishing line 10, said fishing line being of such length as to permit unlimited travel of the artificial lure in a forwardly and downwardly direction when the same is periodically bobbed or jigged by the action of the main fishing line held by the fisherman. As the fisherman continues to bob or jig the lure, said lure will travel a substantially downwardly spiral path with increasingly greater curvature with the fisherman and the hand held line serving as the general center of such radial movement. After the lure has reached a predetermined depth it then proceeds to follow a substantially irregular circular path while at the same time continuing its bobbing and jigging movements.

It will thus be seen that with the fisherman standing in a given place, as in ice fishing or still fishing, and merely bobbing or jigging the fishing line 10 periodically he is able to have the artificial lure cover a substantial area limited only in radius by the length of fishing line let out in each instance.

What I claim is:

1. An artificial fishing lure comprising in combination, an elongated body member having a front end portion and a rear end portion, the side portions of said elongated body member each having a plurality of integral vanes, said vanes being spaced apart at substantially equidistant intervals and forwardly inclined in an upward direction, and means for two point suspension of the artificial fishing lure in a substantially horizontal position.

2. The structure of claim 1 wherein the center of gravity of the said elongated body member is located forward of the geometrical center thereof.

3. The structure of claim 1 further including weight means in the forward end portion of the elongated body member and a floatation chamber at substantially the longitudinal and transverse centers thereof, said weight affording means whereby the preponderance of weight of the elongated body member is forwardly of the geometrical center thereof to unbalance the artificial lure.

References Cited in the file of this patent
UNITED STATES PATENTS

| | | |
|---|---|---|
| 1,101,223 | Welles | June 23, 1914 |
| 1,893,686 | Schilpp | Jan. 10, 1933 |
| 2,184,031 | Wyatt | Dec. 19, 1939 |
| 2,246,413 | Haselwood | June 17, 1941 |
| 2,476,415 | Inchiostro | July 19, 1949 |
| 2,556,205 | McRoberts | June 12, 1951 |
| 2,580,104 | King | Dec. 25, 1951 |
| 2,596,474 | Espey et al. | May 13, 1952 |
| 2,644,265 | Stettner | July 7, 1953 |
| 2,696,694 | Conder et al. | Dec. 14, 1954 |
| 2,716,831 | Glass | Sept. 6, 1955 |
| 2,731,755 | Ward et al. | Jan. 24, 1956 |
| 2,733,535 | Rosen | Feb. 7, 1956 |
| 2,756,534 | Cash | July 31, 1956 |
| 2,766,545 | Wimer | Oct. 16, 1956 |
| 2,871,609 | Noches | Feb. 3, 1959 |
| 3,017,716 | Hawks | Jan. 23, 1962 |
| 3,024,562 | Halling | Mar. 13, 1962 |